(12) United States Patent
Green et al.

(10) Patent No.: US 11,004,668 B2
(45) Date of Patent: May 11, 2021

(54) MULTIPATH DUTY CYCLE ENHANCEMENT FOR MASS SPECTROMETRY

(71) Applicant: Micromass UK Limited, Wilmslow (GB)

(72) Inventors: Martin Raymond Green, Bowdon (GB); David J. Langridge, Macclesfield (GB); Keith Richardson, High Peak (GB); Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 15/315,185

(22) PCT Filed: Jun. 5, 2015

(86) PCT No.: PCT/GB2015/051636
§ 371 (c)(1),
(2) Date: Nov. 30, 2016

(87) PCT Pub. No.: WO2015/185934
PCT Pub. Date: Dec. 10, 2015

(65) Prior Publication Data
US 2017/0213713 A1    Jul. 27, 2017

(30) Foreign Application Priority Data

Jun. 6, 2014 (EP) .................................. 14171475
Jun. 6, 2014 (GB) .................................. 1410049

(51) Int. Cl.
*H01J 49/00* (2006.01)
*H01J 49/06* (2006.01)
*G01N 27/624* (2021.01)

(52) U.S. Cl.
CPC ........ *H01J 49/0045* (2013.01); *G01N 27/624* (2013.01); *H01J 49/0031* (2013.01); *H01J 49/06* (2013.01)

(58) Field of Classification Search
None
See application file for complete search history.

(56) References Cited

U.S. PATENT DOCUMENTS 5,661,298 A    8/1997    Bateman
6,300,627 B1   10/2001   Köster et al.
(Continued)

FOREIGN PATENT DOCUMENTS

DE    102010032823 A1    2/2012
DE    112012005416 T5    8/2014
(Continued)

*Primary Examiner* — James Choi
(74) *Attorney, Agent, or Firm* — Kacvinsky Daisak Bluni PLLC

(57) ABSTRACT

A mass spectrometer is disclosed comprising a first device, a second device and a switch arranged and adapted: (i) to direct ions at a first time T1 to the first device and to substantially prevent ions from entering the second device; and (ii) to direct ions at a second later time T2 to the second device and to substantially prevent ions from entering the first device. At the first time T1 the second device may not be in an operational state to potentially optimally fragment, react, mass filter or otherwise process ions since the second device may be in a process of equilibration, changing state, re-filling, recharging, transition, replenishing, switching voltage or altering an operational parameter. Likewise, at the second time T2 the first device may not be in an operational state to potentially optimally fragment, react, mass filter or otherwise process ions since the first device may be in a process of equilibration, changing state, re-filling, recharging, transition, replenishing, switching voltage or altering an operational parameter.

7 Claims, 2 Drawing Sheets

(56) References Cited

U.S. PATENT DOCUMENTS

| | | |
|---|---|---|
| 7,459,678 B2 | 12/2008 | Schoen |
| 7,728,288 B2 | 6/2010 | Makarov et al. |
| 7,759,638 B2 | 7/2010 | Makarov |
| 7,851,751 B2 | 12/2010 | Bateman |
| 9,147,563 B2 | 9/2015 | Makarov |
| 9,190,251 B2 | 11/2015 | Green et al. |
| 2009/0090853 A1* | 4/2009 | Schoen ................ H01J 49/004 250/282 |
| 2013/0105681 A1 | 5/2013 | Kovtoun |
| 2014/0197308 A1* | 7/2014 | Green ................ H01J 49/401 250/282 |
| 2014/0346345 A1* | 11/2014 | Makarov ............ H01J 49/0031 250/283 |
| 2015/0021472 A1* | 1/2015 | Makarov ............ H01J 49/0045 250/283 |
| 2015/0287585 A1* | 10/2015 | Kovtoun ............ H01J 49/4295 250/283 |

FOREIGN PATENT DOCUMENTS

| | | | | |
|---|---|---|---|---|
| GB | 2392005 | | 2/2004 | |
| GB | 201106689 | * | 6/2011 | ......... H01J 49/0031 |
| GB | 2511239 A | * | 8/2014 | ......... H01J 49/0031 |
| JP | H11144675 | | 5/1999 | |
| WO | WO 2013092923 A2 | * | 6/2013 | ......... H01J 49/0045 |

* cited by examiner

MULTIPATH DUTY CYCLE ENHANCEMENT FOR MASS SPECTROMETRY

CROSS-REFERENCE TO RELATED APPLICATION APPLICATIONS

This application represents the U.S. National Phase of International Application number PCT/GB2015/051636 entitled "Multipath Duty Cycle Enhancement" filed 5 Jun. 2015, which claims priority from and the benefit of United Kingdom patent application No. 1410049.9 filed on 6 Jun. 2014 and European patent application No. 14171475.8 filed on 6 Jun. 2014. The entire contents of these applications are incorporated herein by reference.

FIELD OF THE PRESENT INVENTION

The present invention relates to a mass spectrometer and a method of performing mass spectrometry.

BACKGROUND

Conventional mass spectrometers are typically arranged so as to have a linear ion path which is bounded at one end by an ion source and at the other end by an ion detector. Ions must pass through all of the intermediate ion guides, filters, fragmentation cells and reaction devices in order to reach the ion detector.

The types of devices that can be located along the ion path are therefore limited to those devices that can transmit all ions of interest without causing unwanted attenuation, reaction or fragmentation in any required operating mode. Where a device is required to be operated in several different modes of operation within a single experiment, the duty cycle of the instrument will be limited by the time taken to change the state of the device, allowing for any settling time, flushing time and refill time.

It is known to introduce a switch to allow ions to be diverted along a second path, for example to an intermediate ion detector or alternatively to by-pass a fragmentation cell completely and to re-join the original ion path downstream of the fragmentation device. This allows rapid switching between fragmenting and non-fragmenting modes. For instance, U.S. Pat. No. 7,851,751 (Micromass) discloses an arrangement wherein parent ions are alternately caused to pass to and to by-pass a fragmentation device.

GB-2392005 (Micromass) discloses an ion guide comprising a plurality of horizontal plates wherein ions may be switched between different channels formed within the ion guide.

WO 2013/092923 (Makarov) discloses a collision cell for tandem mass spectrometry wherein precursor ions are assigned to their own particular channel of a multi compartment collision cell for parallel simultaneous fragmentation.

It is desired to provide an improved mass spectrometer.

SUMMARY

According to an aspect there is provided a mass spectrometer comprising:
a first device;
a second device; and
a switch arranged and adapted:
(i) to direct ions at a first time T1 to the first device and to substantially prevent ions from entering the second device; and
(ii) to direct ions at a second later time T2 to the second device and to substantially prevent ions from entering the first device;
wherein either:
(a) at the first time T1 the second device is not in an operational state to potentially optimally fragment, react, mass filter or otherwise process ions since the second device is in a process of equilibration, changing state, re-filling, recharging, transition, replenishing, switching voltage or altering an operational parameter; and/or
(b) at the second time T2 the first device is not in an operational state to potentially optimally fragment, react, mass filter or otherwise process ions since the first device is in a process of equilibration, changing state, re-filling, recharging, transition, replenishing, switching voltage or altering an operational parameter.

The techniques described herein may provide a mass spectrometer or method of mass spectrometry with an improved duty cycle. In particular, the techniques described herein may overcome the problem of the duty cycle being limited by mode or state switching.

In conventional mass spectrometry instruments ions typically follow a single ion path through a mass spectrometer. In order to switch between different operating modes or states of the mass spectrometer it is generally necessary to change the state of one or more device along the ion path. The time taken to change the state of a device along the ion path fundamentally limits the duty cycle of the instrument.

The duty cycle may be increased by providing a mass spectrometer comprising at least two devices and at least one switch arranged such that during some time periods ions are allowed to enter a first device and are prevented from entering a second device which is changing state and/or analysing ions and/or separating ions and/or remaining in a steady state. When the state of the switch is changed (e.g. at time T2), ions may then be allowed to enter the second device and be prevented from entering the first device which is changing state and/or analysing ions and/or separating ions and/or remaining in a steady state.

There are thus two or more possible ion paths through the mass spectrometer along which ions may alternatively be directed. It has been recognised that switching between the two or more possible different ion paths can generally happen faster than the time taken to change the mode of operation of a single device. The techniques described herein therefore enable the mass spectrometer to switch rapidly between operating modes with improved duty cycle. Furthermore, at least in some embodiments, any devices along the ion path not currently in use may be reconfigured without affecting or limiting the duty cycle of the current measurement.

WO 2013/092923 (Makarov) discloses an arrangement wherein ions are sequentially passed to separate compartments of a collision cell where they are simultaneously fragmented. There is no recognition of overcoming the problem of a duty cycle being limited by mode or state changing by directing ions to a first (and/or second) device during a time period whilst a second (and/or first) device is in a process of equilibration, changing state, re-filling, recharging, transition, replenishing, switching voltage or altering an operational parameter.

In the techniques described herein the first device may generally be disposed on a first ion path and the second device on a second ion path. Ions following or originating on different ion paths may subsequently be recombined before being passed to a common ion detector or mass analyser. The ions (i.e. and/or data acquired from the ions) following or originating on different ion paths (or precursor or product ions associated with these ions) may effectively be labelled according to their ion path.

The techniques described herein thus enable the mass spectrometer to switch rapidly between two or more different types of fragmentation or to cause ions with different properties to be separated, filtered, fragmented or reacted differently.

There are many examples of mass spectrometry experiments that would conventionally be limited in the manner described above and that may benefit from the techniques described herein.

For example, a quadrupole mass spectrometer monitoring multiple precursor or parent ions and/or fragment ions has to switch state many times per second and a minimum inter-scan time is required to allow the state of the quadrupole to change. The techniques described herein can avoid this by arranging two quadrupoles in parallel that can be used in parallel with a high duty cycle. Thus, in embodiments the first device may comprise a first mass or mass to charge ratio filter and the second devices may comprise a second mass or mass to charge ratio filter.

Another example is Electron Transfer Dissociation ("ETD") reagent trapped in a gas cell into which analyte ions are introduced to allow a fragmentation reaction to take place. When the ETD reagent is exhausted, a refill time is required before more analyte ions can be introduced. The techniques described herein avoid this by, for example, arranging two ETD cells in parallel so that one can be used for ETD fragmentation whilst the other is being refilled. Thus, in embodiments the first device may comprise a first ETD fragmentation or reaction device and the second device may comprise a second ETD fragmentation or reaction device.

Similarly, an ETD cell may be arranged in parallel with another fragmentation or reaction device such as a Collisional Induced Dissociation ("CID") fragmentation device. Ions may be directed to the CID fragmentation device whilst the ETD cell is being re-filled. The CID cell may be left static whilst ions are alternatively directed to the ETD cell. Alternatively/additionally the CID cell may be cleared of ions to avoid crosstalk and/or the collision energy may be changed whilst the ions are being alternatively directed to the ETD cell. Thus, in embodiments the first device may comprise a CID fragmentation device and the second device may comprise an ETD fragmentation or reaction device.

The first device may comprise a Collisional Induced Dissociation ("CID") fragmentation device, an Electron Transfer Dissociation ("ETD") fragmentation or reaction device or a mass or mass to charge ratio filter.

The second device may comprise a Collisional Induced Dissociation ("CID") fragmentation device, an Electron Transfer Dissociation ("ETD") fragmentation or reaction device or a mass or mass to charge ratio filter.

At the first time T1 the first device may be in a state to optimally fragment, react, mass filter or otherwise process the ions.

At the first time T1 the second device may be in a state to potentially optimally fragment, react, mass filter or otherwise process ions. At the first time T1 the second device may alternatively not be in a state to potentially optimally fragment, react, mass filter or otherwise process ions.

At the second time T2 the second device may be in a state to optimally fragment, react, mass filter or otherwise process the ions.

At the second time T2 the first device may be in a state to potentially optimally fragment, react, mass filter or otherwise process ions. At the second time T2 the first device may alternatively not be in a state to potentially optimally fragment, react, mass filter or otherwise process ions.

The first device may comprise one or more fragmentation or reaction devices.

The first device may comprise a fragmentation or reaction device selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The second device may comprise one or more fragmentation or reaction devices.

The second device may comprise a fragmentation or reaction device selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The first device may comprise one or more mass or mass to charge ratio filters.

The one or more mass or mass to charge ratio filters may comprise one or more quadrupole rod set mass filters and/or one or more time of flight regions.

The second device may comprise one or more mass or mass to charge ratio filters.

The one or more mass or mass to charge ratio filters may comprise one or more quadrupole rod set mass filters and/or one or more time of flight regions.

The first device may comprise one or more ion mobility separation devices and/or one or more Field Asymmetric Ion Mobility Spectrometer devices.

The second device may comprise one or more ion mobility separation devices and/or one or more Field Asymmetric Ion Mobility Spectrometer devices.

The switch may be further arranged and adapted:

(iii) to direct ions at a third time T3 to the first device and to substantially prevent ions from entering the second device; and optionally (iv) to direct ions at a fourth later time T4 to the second device and to substantially prevent ions from entering the first device;

wherein T4>T3>T2>T1.

The switch may be further arranged and adapted to repeatedly switch between: (a) directing ions to the first device and substantially preventing ions from entering the second device; and (b) directing ions to the second device and substantially preventing ions from entering the first device.

According to another aspect there is provided a method of mass spectrometry comprising:

providing a first device and a second device; and using a switch:

(i) to direct ions at a first time T1 to the first device and to substantially prevent ions from entering the second device; and (ii) to direct ions at a second later time T2 to the second device and to substantially prevent ions from entering the first device;

wherein either:

(a) at the first time T1 the second device is not in an operational state to potentially optimally fragment, react, mass filter or otherwise process ions since the second device is in a process of equilibration, changing state, re-filling, recharging, transition, replenishing, switching voltage or altering an operational parameter; and/or (b) at the second time T2 the first device is not in an operational state to potentially optimally fragment, react, mass filter or otherwise process ions since the first device is in a process of equilibration, changing state, re-filling, recharging, transition, replenishing, switching voltage or altering an operational parameter.

According to another aspect there is provided a mass spectrometer comprising:

a first device;

a second device; and a switch or beam splitter arranged and adapted:

(i) to direct ions at a first time T1 to the first device; and (ii) to direct ions at a second later time T2 to the second device.

It will be understood that any or all of the features described above in relation to the previous aspects are compatible with and may also be combined with this aspect, at least to the extent that they are not mutually incompatible.

The techniques described herein may also provide an improved duty cycle in parallel or multiplexed analyses more generally, i.e. regardless of whether the first (and/or second) device is in a process of equilibration, changing state, re-filling, recharging, transition, replenishing, switching voltage or altering an operational parameter whilst ions are directed to the second (and/or first) device. For example, a switch or beam splitter may generally be used to perform parallel or multiplexed fragmentation and/or reaction processes, or parallel mass and/or ion mobility separations or filtering. That is, the use of two or more different ion paths along which ions may be alternatively directed using a switch or beam splitter may be advantageous itself.

For example, the mass spectrometer may comprise two or more ion mobility separation devices or mass filters arranged in parallel. Particularly where these devices communicate with an upstream trapping device, a parallel arrangement may also allow an increase in charge capacity.

As another example, the mass spectrometer may comprise a CID cell and ETD cell arranged in parallel. The use of a beam splitter or a switch allows an incoming stream of ions to be subjected to both CID and ETD substantially simultaneously (i.e. or within the timescale of the switching).

The ions (or associated precursor or product ions) directed towards the different devices or along the different ion paths, may subsequently be recombined and passed towards an ion detector or mass analyser of the mass spectrometer. The ions, or the data acquired from the ions, may be labelled according to which ion path was followed.

The switch or beam splitter may be arranged and adapted, at the first time T1, to substantially prevent ions from entering the second device and/or the switch or beam splitter may be arranged and adapted, at the second later time T2, to substantially prevent ions from entering the first device.

In embodiments, either:

(a) the first device comprises a first Collision Induced Dissociation fragmentation device which is arranged and adapted to cause ions to be fragmented with a first fragmentation energy and wherein the second device comprises a second Collision Induced Dissociation fragmentation device which is arranged and adapted to cause ions to be fragmented with a second different fragmentation energy; and/or (b) the first device comprises a first mass or mass to charge ratio filter which is arranged and adapted to mass filter ions so that ions having a first range of masses or mass to charge ratios are onwardly transmitted and wherein the second device comprises a second mass or mass to charge ratio filter which is arranged and adapted to mass filter ions so that ions having a second different range of masses or mass to charge ratios are onwardly transmitted; and/or (c) the first device comprises a first ion mobility or differential ion mobility spectrometer or separator and wherein the second device comprises a second ion mobility or differential ion mobility spectrometer or separator; and/or t ionthe first device comprises a Collision Induced Dissociation fragmentation device and wherein the second device comprises an Electron Transfer Dissociation reaction device; and/or (e) the first device comprises a first Electron Transfer Dissociation reaction device and wherein the second device comprises a second Electron Transfer Dissociation reaction device.

Where the first and second devices comprise first and second Collisional Induced Dissociation fragmentation devices, first and second Electron Transfer Dissociation reaction devices and/or a Collisional Induced Dissociation fragmentation device and an Electron Transfer Dissociation reaction device, the first and second devices may be provided within the same gas cell or housing.

The first device may be disposed on a first ion path and the second device on a second ion path and data acquired by the mass spectrometer may be labelled according to the respective ion path.

Accordingly, the method in any of the aspects described herein may comprise acquiring data from the ions directed to the first and/or second devices and labelling this data according to the respective ion path.

For instance, where data is acquired from ions following different ion paths through the mass spectrometer, the data may be labelled by maintaining a separation of ions along the different ion paths e.g. and synchronising an ion detector or mass analyser of the mass spectrometer with the operation of the switches and/or devices. Additionally/alternatively, one or more devices may be provided to packetise the ion beams emerging from the different ion paths. Furthermore, the ion beams and/or data associated with the different ion paths may be encoded or modulated to label the data.

According to yet another aspect there is provided a method of mass spectrometry comprising:

providing a first device and a second device; and
using a switch or beam splitter:
(i) to direct ions at a first time T1 to the first device; and
(ii) to direct ions at a second later time T2 to the second device.

The method may comprise using the switch:
(i) to direct ions at a first time T1 to the first device and to substantially prevent ions from entering the second device; and
(ii) to direct ions at a second later time T2 to the second device and to substantially prevent ions from entering the first device.

In embodiments, either:
(a) the first device comprises a first Collision Induced Dissociation fragmentation device which is arranged and adapted to cause ions to be fragmented with a first fragmentation energy and wherein the second device comprises a second Collision Induced Dissociation fragmentation device which is arranged and adapted to cause ions to be fragmented with a second different fragmentation energy; and/or (b) the first device comprises a first mass or mass to charge ratio filter which is arranged and adapted to mass filter ions so that ions having a first range of masses or mass to charge ratios are onwardly transmitted and wherein the second device comprises a second mass or mass to charge ratio filter which is arranged and adapted to mass filter ions so that ions having a second different range of masses or mass to charge ratios are onwardly transmitted; and/or (c) the first device comprises a first ion mobility or differential ion mobility spectrometer or separator and wherein the second device comprises a second ion mobility or differential ion mobility spectrometer or separator; and/or (d) the first device comprises a Collision Induced Dissociation fragmentation device and wherein the second device comprises an Electron Transfer Dissociation reaction device; and/or (e) the first device comprises a first Electron Transfer Dissociation reaction device and wherein the second device comprises a second Electron Transfer Dissociation reaction device.

According to another aspect there is provided a mass spectrometer comprising:

a first device;
a second device; and
a switch arranged and adapted:
(i) to direct ions at a first time T1 to the first device and to substantially prevent ions from entering the second device; and
(ii) to direct ions at a second later time T2 to the second device and to substantially prevent ions from entering the first device;

wherein either:
(a) the first device comprises a first Collision Induced Dissociation fragmentation device which is arranged and adapted to cause ions to be fragmented with a first fragmentation energy and wherein the second device comprises a second Collision Induced Dissociation fragmentation device which is arranged and adapted to cause ions to be fragmented with a second different fragmentation energy; and/or (b) the first device comprises a first mass or mass to charge ratio filter which is arranged and adapted to mass filter ions so that ions having a first range of masses or mass to charge ratios are onwardly transmitted and wherein the second device comprises a second mass or mass to charge ratio filter which is arranged and adapted to mass filter ions so that ions having a second different range of masses or mass to charge ratios are onwardly transmitted; and/or (c) the first device comprises a first ion mobility or differential ion mobility spectrometer or separator and wherein the second device comprises a second ion mobility or differential ion mobility spectrometer or separator.

The first Collision Induced Dissociation fragmentation device and the second Collision Induced Dissociation fragmentation device may be provided within the same gas cell or housing.

According to another aspect there is provided a method of mass spectrometry comprising:

providing a first device and a second device; and
using a switch:
(i) to direct ions at a first time T1 to the first device and to substantially prevent ions from entering the second device; and
(ii) to direct ions at a second later time T2 to the second device and to substantially prevent ions from entering the first device;

wherein either:
(a) the first device comprises a first Collision Induced Dissociation fragmentation device which is arranged and adapted to cause ions to be fragmented with a first fragmentation energy and wherein the second device comprises a second Collision Induced Dissociation fragmentation device which is arranged and adapted to cause ions to be fragmented with a second different fragmentation energy; and/or (b) the first device comprises a first mass or mass to charge ratio filter which is arranged and adapted to mass filter ions so that ions having a first range of masses or mass to charge ratios are onwardly transmitted and wherein the second device comprises a second mass or mass to charge ratio filter which is arranged and adapted to mass filter ions so that ions having a second different range of masses or mass to charge ratios are onwardly transmitted; and/or (c) the first device comprises a first ion mobility or differential ion mobility spectrometer or separator and wherein the second device comprises a second ion mobility or differential ion mobility spectrometer or separator.

According to an aspect there is provided a method of mass spectrometry comprising providing a first device and a second device;

providing one or more switches arranged to direct analyte ions which originate from or are derived from a first population to enter the first device and substantially prevent analyte ions from entering the second device during a time period T1-T2 where T2>T1;

allowing the second device to equilibrate and/or change state and/or analyse and/or separate and/or remain in a ready state etc. during time T1-T2;

arranging the switch such that analyte ions which originate from or are derived from the first or a second population enter the second device and substantially prevent analyte ions entering the first device during a time period T2-T3 where T3>T2;

allowing the first device to equilibrate and/or change state and/or analyse and/or separate and/or remain in a ready state etc. during time T2-T3 such that the duty cycle of the first and or second device is improved.

The switch may be arranged to repetitively switch between states in a predetermined sequence.

The first device and the second device may generally comprise quadrupole rod set and/or ion mobility spectrometer or separator devices or combinations thereof.

According to an embodiment more than two devices may be present.

The control system may operate partly or wholly in a feedback or data dependent mode.

According to an embodiment at least one switch is positioned downstream of a mobility device and operates within a mobility separation timescale.

According to an embodiment at least one device is an Electron Transfer Dissociation fragmentation cell and another device is a Collision Induced Dissociation fragmentation cell.

According to an embodiment the at least two devices comprise Electron Transfer Dissociation fragmentation cells.

According to an embodiment ion guides which connect the devices comprise stacked ring ion guides, travelling wave ion guides, straight or curved multipole ion guides, PCB's etc. or any combination of these.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) >about 500 V peak to peak.

The AC or RF voltage may have a frequency selected from the group consisting of: (i) <about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) >about 10.0 MHz.

The mass spectrometer may also comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

According to an embodiment analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

According to an embodiment in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

The multiply charged analyte cations or positively charged ions may comprise peptides, polypeptides, proteins or biomolecules.

According to an embodiment in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

According to an embodiment the process of Electron Transfer Dissociation fragmentation comprises interacting analyte ions with reagent ions, wherein the reagent ions comprise dicyanobenzene, 4-nitrotoluene or azulene.

BRIEF DESCRIPTION OF THE DRAWINGS

Various embodiments will now be described, by way of example only, and with reference to the accompanying drawings in which.

DETAILED DESCRIPTION

An example incorporating the techniques described herein will now be described. The techniques described herein enable a mass spectrometer to be operated in a mode of operation so as to switch rapidly between two or more different types of fragmentation or other modes of operation, or to cause ions with different properties to be separated, filtered, fragmented or reacted differently.

The techniques described herein typically find utility in mass spectrometry instruments comprising a series of devices D1 ... DN wherein N≥2. The devices may generally be connected by ion guides and one or more switches S1 ... SM wherein M≥1. The switches may be arranged to cause ions to move along one or more of the possible paths through the mass spectrometer.

The switches are generally capable of being moved rapidly, specifically that the time taken to change the path taken by ions should be less than the time that would have been required to change the state of a downstream device (for example from Electron Transfer Dissociation mode to Collision Induced Dissociation mode or from one mass range to another mass range in the case of a mass filter).

Any devices that are not on the currently active ion path may be prepared for future use. This may include a change in state (e.g. the target mass of a mass filter), replenishing any reagent (e.g. in an Electron Transfer Dissociation cell), clearing or flushing out any residual ions in the cell, changing the gas present in a fragmentation or mobility cell or changing the function of the cell entirely.

Downstream of locations at which multiple ion paths recombine, the temporal separation of ions that have followed or originated on different paths may substantially be maintained. In this case the operation of the ion detector or downstream mass spectrometer may be synchronised with the operation of the switches and devices in use so that the data acquired can be labelled with the path(s) followed by the detected ions (and/or their precursors).

One or more devices may be used to packetise or remerge an ion beam. Where two or more continuous ion beams are recombined, packetisation may be introduced at the recombination point by arranging for a DC barrier at the end point of each ion upstream ion guide. When the barrier is active, the end of each ion guide acts as an ion trap. Ions may then be released from each ion guide in turn.

Alternatively, the beams may be remerged so that direct information concerning the origin of the ions is lost and propagated to the next part of the instrument. Various forms of encoding (e.g. modulation) may be used to preserve, indirectly, information concerning the origin of ions.

The switch may comprise an electrode or set of electrodes arranged to deflect the ion beam along a chosen ion guide.

Figure 1:
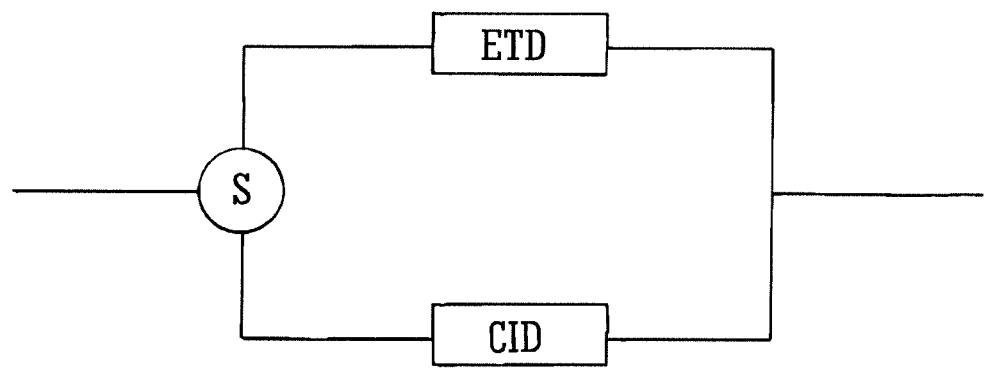
FIG. 1 shows parallel Electron Transfer Dissociation and Collision Induced Dissociation devices according to an embodiment.

FIG. 1 shows an embodiment comprising a mass spectrometer comprising at least one Collision Induced Dissociation fragmentation cell in parallel with an Electron Transfer Dissociation fragmentation cell along with a feedback control system to cause ions with one set of properties to pass to the Collision Induced Dissociation cell and ions with a second set of properties to pass to the Electron Transfer Dissociation cell. In a proteomics experiment for example, it may be advantageous to fragment highly charged peptides ($z>2$) using Electron Transfer Dissociation and fragment low charge state peptides ($z=1,2$) using Collision Induced Dissociation. The charge state of the peptide can be determined by real time data processing.

Alternatively, in a data independent mode of operation, the switch may simply cause ions to be fragmented alternately in the Electron Transfer Dissociation and Collision Induced Dissociation cells. When the Collision Induced Dissociation cell is in use, the Electron Transfer Dissociation cell may be refilled with reagent.

Figure 2:
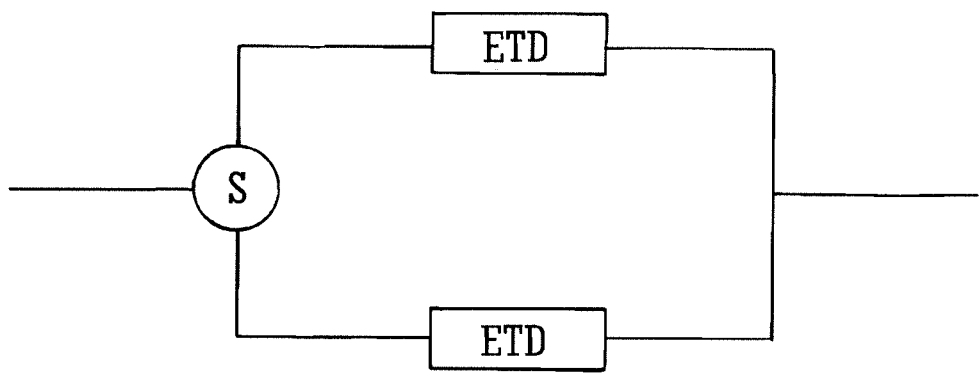
FIG. 2 shows parallel Electron Transfer Dissociation devices according to an embodiment.

FIG. 2 shows an embodiment wherein a mass spectrometer comprises at least two Electron Transfer Dissociation fragmentation cells along with a feedback control system to cause ions to pass to the Electron Transfer Dissociation cells in an alternating or round-robin pattern allowing time for each Electron Transfer Dissociation cell to refill or be switched OFF, purged and/or refilled with a different reagent.

According to another embodiment the mass spectrometer may comprise an ion mobility separator followed by a mass filter followed by a switch followed by parallel Electron Transfer Dissociation and Collision Induced Dissociation devices along with a feedback control system. The mass filter may be capable of being switched within the timescale of the ion mobility spectrometer or separator separation so that different species can be fragmented by Electron Transfer Dissociation or Collision Induced Dissociation in a single ion mobility spectrometer or separator experiment.

According to another embodiment the mass spectrometer may comprise a switch followed by two or more mass filters in parallel. Using a pair of quadrupoles in parallel, when one quadrupole is in use, the other quadrupole may be set to resolve the next required mass window, thereby eliminating the inter scan delay that is normally introduced to allow the quadrupole to settle. This increases the duty cycle of the mass spectrometer.

Figure 3:
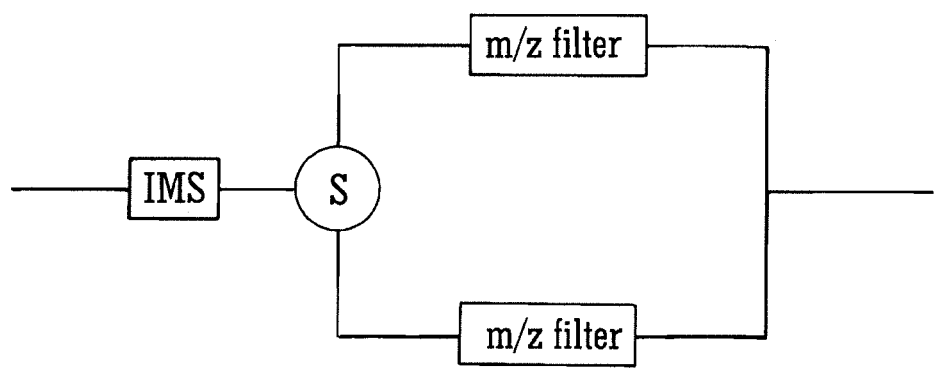
FIG. 3 shows an ion mobility spectrometer ("IMS") followed by parallel mass filters according to an embodiment.

FIG. 3 shows an embodiment comprising a mass spectrometer comprising an ion mobility separator followed by a switch followed by two or more mass filters in parallel. The advantages of this geometry are similar to the embodiment described above, but since ion mobility separation often operates on short timescales the need for rapid switching is greater.

Further embodiments are contemplated comprising triple-quadrupole geometries wherein all ions pass through a single collision cell followed by a second switch and wherein there are two distinct ion paths each passing through a quadrupole, collision cell and second quadrupole.

Figure 4:
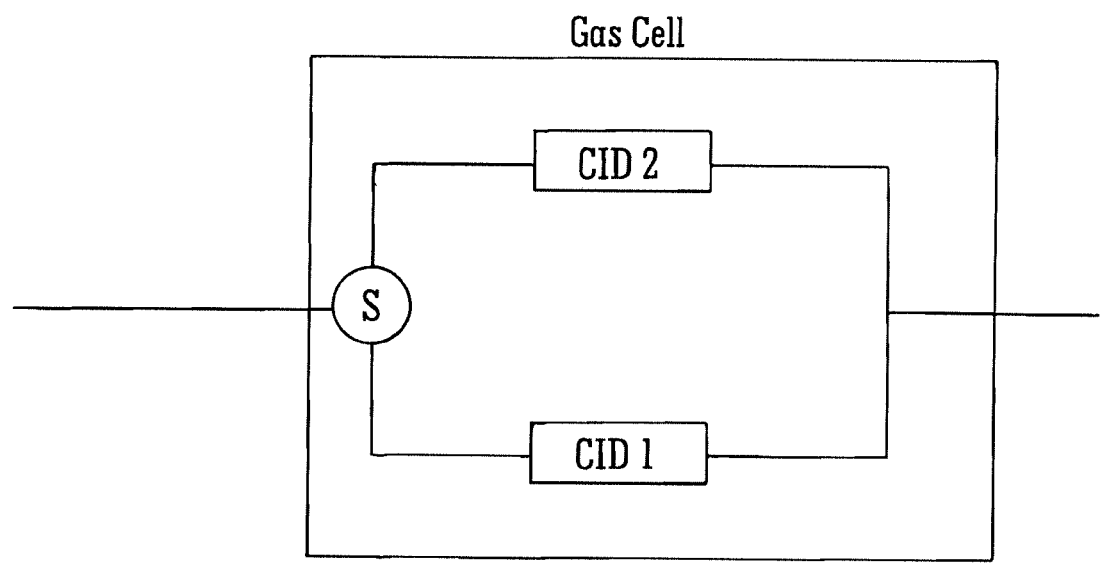
FIG. 4 shows Collision Induced Dissociation at two different energies in a single gas cell according to an embodiment.

FIG. 4 illustrates another embodiment wherein all or part of two or more ion paths pass through a single gas cell. This allows, for example, parallel Collision Induced Dissociation experiments to be performed at two different energies in a single gas cell with a consequent reduction in size, cost and pumping requirements compared with an implementation using two gas cells. In the example shown in FIG. 4 the switch and recombination point have been placed inside the gas cell so that the gas cell has only two apertures (entrance and exit).

In a similar fashion, Electron Transfer Dissociation and Collision Induced Dissociation may also be carried out in a single gas cell.

According to an embodiment one or more of the devices comprise a trap for performing photo-fragmentation.

According to an embodiment one or more of the devices comprise an analytical trap.

Embodiments are also contemplated wherein the mass spectrometer additionally comprises an ion path which bypasses any or all of the two or more devices.

Figure 5:
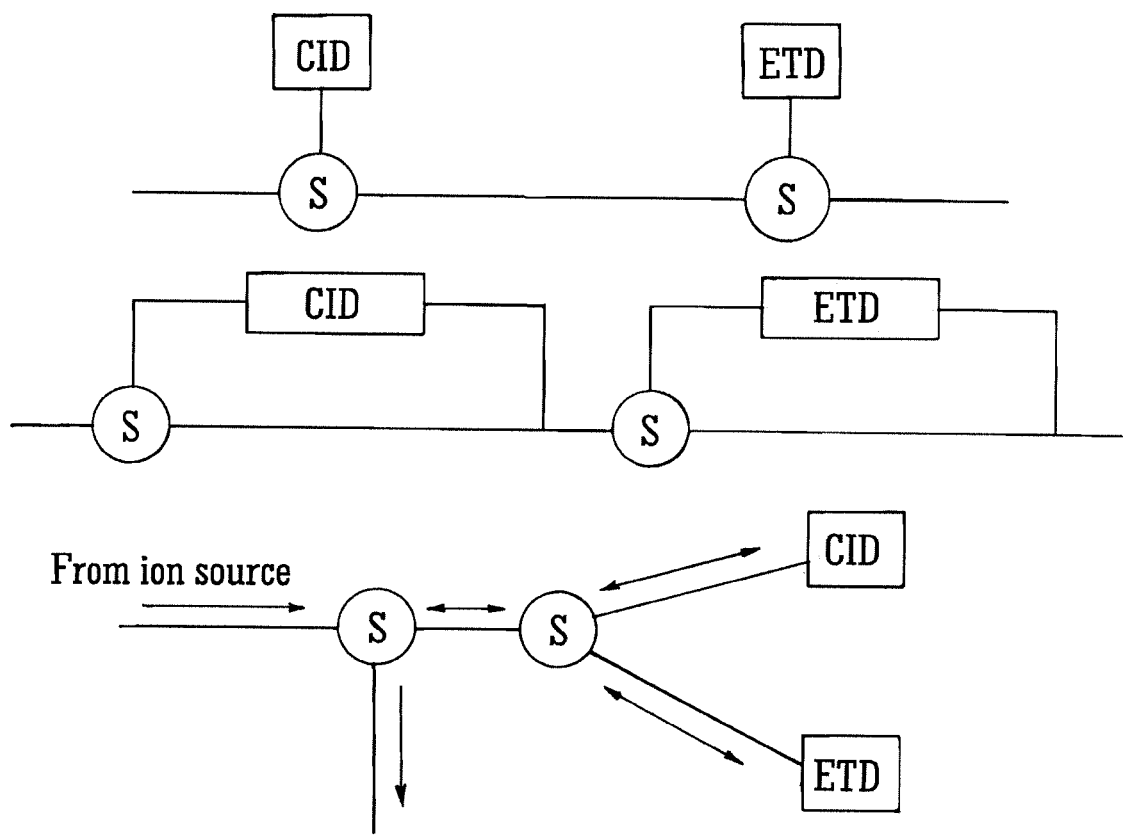
FIG. 5 shows multiple geometries which utilise Collision Induced Dissociation and/or Electron Transfer Dissociation according to an embodiment.

In particular this includes geometries such as those depicted in FIG. 5. Collision Induced Dissociation and Electron Transfer Dissociation are given as examples, but other devices could be substituted.

According to another embodiment one or more of the fragmentation devices can be operated in a passive or transmission only mode.

According to another embodiment two or more parallel paths may form part of a conjoined ion guide (step wave like arrangement). In this type of embodiment switches may be created dynamically at arbitrary positions.

According to another embodiment a fixed or variable delay device may be present on one or more ion guides to allow resynchronisation of ions that have followed different paths through the mass spectrometer.

Embodiments are also contemplated wherein two or more ion mobility spectrometer or separator ("IMS") devices are arranged in parallel.

The duty cycle of a multiplexing gating ion mobility spectrometer or separator device can be improved. Ions are allowed to pass to any ion mobility spectrometer or separator ("IMS") device or none and each device can be operated in a multiplexed mode. In this embodiment it is advantageous to keep the output of the ion mobility spectrometer or separator devices separated in packets so that the acquired data can be labelled according to the path taken by the ions.

The charge capacity of a trapping ion mobility spectrometer or separator device can be improved by arranging for two ion mobility spectrometer or separator devices to operate in parallel. Unless the devices are synchronized it may be desirable to arrange for the output of the two devices to be kept separate as described above.

Various alternative embodiments are contemplated.

One or more switches may be replaced with a beam splitter allowing, for example, parallel Electron Transfer Dissociation and Collision Induced Dissociation fragmentation. Again, the separation in the beam downstream of the devices may optionally be retained (for example by travelling wave packets separated by barriers sufficiently high to prevent mixing). When the separation is retained, an acquisition system would be configured to separately acquire the data that has followed different paths through the device. Where the final mass analyser is an orthogonal acceleration Time of Flight mass analyser, it would be particularly convenient to associate individual pushes with ion packets which are effectively labelled by the path that they have followed.

As an example, this arrangement would be useful where a slow ion mobility spectrometer or separator device follows a fast chromatographic device so that the timescale required for ion mobility spectrometer or separator separation becomes comparable to the chromatographic peak width. Ion mobility ("IMS") and liquid chromatography ("LC") profiles can then be obtained for both the Electron Transfer Dissociation and Collision Induced Dissociation experiments.

Alternatively, the fragment ions may be remixed allowing the acquisition of mixed mode spectra (such as Collision Induced Dissociation and Electron Transfer Dissociation).

Additional ion sources may be introduced to supply reagent ions to reaction cells.

Mass spectrometers typically contain regions with different operating pressures. For example, the source often consists of a series of differentially pumped regions at successively lower pressures connected by small orifices through which ions (and some gas) pass. In the source, ions generally move through orifices in the same direction as the gas flow. However, it is sometimes necessary for ions to move from a low pressure region into a high pressure region. One example is a quadrupole-ion mobility spectrometer (Q-IMS) in which ions may be mass selected by a quadrupole prior to ion mobility separation. In such cases, the ions must be guided through an orifice against a gas flow which can lead to unwanted excitation, fragmentation or reduced transmission of the ions. However, there may be operating modes of the instrument which do not require pre-mobility mass selection. In some embodiments a pressure bypass may be introduced which allows ions to pass from one region of relatively high pressure p1 to another region of relatively high pressure p2, bypassing a region of substantially lower pressure p3 through which ions would otherwise pass. Specifically, p1>p3, p2>p3 and where p2>p1 the pressure difference p2−p1 must be low enough to avoid unwanted excitation, fragmentation or loss of ions. It may be necessary to switch rapidly between modes requiring the quadrupole and modes not requiring the quadrupole.

Various further geometries involving multiple switches and branching ion paths are contemplated.

According to an embodiment several devices may be left in a static condition for an extended period of time to be used in a predetermined sequence (program) or in a data dependent fashion. After some period of time, the program may be changed and some or all of the devices may be moved into a new state.

As an example, in the state of the art, typical chromatographic experiments (e.g. in selected ion recording) on quadrupole instruments involve moving a quadrupole through a program consisting of a repeating sequence or cycle of target m/z values corresponding to currently eluting target compounds. At a later retention time a new program begins and some or all of the quadrupoles will move to new target m/z values. If several quadrupoles are arranged in parallel, then some or all of them may remain static for the duration of each program with a corresponding improvement in duty cycle.

In a tandem quadrupole experiment in which two or more quadrupole mass filters are separated by one or more gas cells, one or more of the quadrupoles may be replaced by an array of quadrupoles in parallel configured to be used as described above.

Another reason to switch repeatedly between two or more devices is to prevent unwanted mixing of species in a single device (e.g. CID fragments or ion-ion or ion-molecule reaction products formed in the device downstream of a quadrupole). Mixing may occur when the time between introduction of different species is smaller than or comparable to differences in transit time through the device. Further measures may be taken to keep the output from the two devices separate downstream of the junction of the ion paths as described elsewhere (e.g. packetisation using alternating DC barriers).

Although the present invention has been described with reference to particular embodiments, it will be understood by those skilled in the art that various changes in form and detail may be made without departing from the scope of the invention as set forth in the accompanying claims.

The invention claimed is:

1. A mass spectrometer comprising
a first device, wherein the first device comprises (i) one or more fragmentation or reaction devices, (ii) one or more mass or mass to charge ratio filters, or (iii) one or more ion mobility separation devices and/or one or more Field Asymmetric Ion Mobility Spectrometer devices;
a second device, wherein the second device comprises (i) one or more fragmentation or reaction devices, (ii) one or more mass or mass to charge ratio filters, or (iii) one or more ion mobility separation devices and/or one or more Field Asymmetric Ion Mobility Spectrometer devices;
a switch; and
a control system configured to cause the switch:
(a) to direct ions at a first time T1 to said first device and to substantially prevent ions from entering said second device, wherein at said first time T1 said first device is in a state to fragment, react, or mass filter said ions whereas said second device is not in an operational state to optimally fragment, react, or mass filter ions as said second device is in a process of changing operational state; and
(b) to direct ions at a second later time T2 to said second device and to substantially prevent ions from entering said first device,
wherein at said second time T2 said second device is in a state to fragment, react, or mass filter said ions whereas said first device is not in an operational state to optimally fragment, react, or mass filter ions since said first device is in a process of changing operational state;
wherein said switch is further arranged and adapted to repeatedly switch between: (a) directing ions to said first device and substantially preventing ions from entering said second device; and (b) directing ions to said second device and substantially preventing ions from entering said first device.

2. A mass spectrometer as claimed in claim 1, wherein said first device comprises a fragmentation or reaction device selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

3. A mass spectrometer as claimed in claim 1, wherein said one or more mass or mass to charge ratio filters comprises one or more quadrupole rod set mass filters and/or one or more time of flight regions.

4. A method of mass spectrometry comprising:
providing a first device, wherein the first device comprises: (i) one or more fragmentation or reaction devices; (ii) one or more mass or mass to charge ratio filters; or (iii) one or more ion mobility separation devices and/or one or more Field Asymmetric Ion Mobility Spectrometer devices;
providing a second device, wherein the second device comprises: (i) one or more fragmentation or reaction devices; (ii) one or more mass or mass to charge ratio filters; or (iii) one or more ion mobility separation devices and/or one or more Field Asymmetric Ion Mobility Spectrometer devices; and
using a switch:
(a) to direct ions at a first time T1 to said first device and to substantially prevent ions from entering said second device, wherein at said first time T1 said first device is in an operational state to fragment, react, or mass filter said ions whereas said second device is not in an operational state to optimally fragment, react, or mass filter said ions since said second device is in a process of changing operational state; and
(b) to direct ions at a second later time T2 to said second device and to substantially prevent ions from entering said first device wherein
at said second time T2 said second device is in an operational state to fragment, react, or mass filter said ions whereas said first device is not in an operational state to optimally fragment, react, or mass filter said ions since said first device is in a process of changing operational state;

wherein said switch is further arranged and adapted to repeatedly switch between: (a) directing ions to said first device and substantially preventing ions from entering said second device; and (b) directing ions to said second device and substantially preventing ions from entering said first device.

5. A mass spectrometer as claimed in claim 1, wherein said first device is disposed on a first ion path and said second device is disposed on a second ion path and wherein data acquired by the mass spectrometer is labelled according to the respective ion path.

6. A mass spectrometer as claimed in claim 1, wherein the process of changing operational state of a device comprises changing an operational parameter of the device and/or comprises the device being in a process of equilibration.

7. A method of mass spectrometry as claimed in claim 4, wherein the process of changing operational state of a device comprises changing an operational parameter of the device and/or comprises the device being in a process of equilibration.

* * * * *